United States Patent
Patel et al.

(10) Patent No.: US 11,605,840 B2
(45) Date of Patent: Mar. 14, 2023

(54) DIRECT OR CABLE CONNECT HIGH POWER DELIVERY BATTERY

(71) Applicant: Xentris Wireless LLC, Addison, IL (US)

(72) Inventors: Vivek Patel, Elk Grove Village, IL (US); Rick Nowinski, Woodridge, IL (US)

(73) Assignee: Xentris Wireless LLC, Addison, IL (US)

( * ) Notice: Subject to any disclaimer, the term of this patent is extended or adjusted under 35 U.S.C. 154(b) by 198 days.

(21) Appl. No.: 17/212,945

(22) Filed: Mar. 25, 2021

(65) Prior Publication Data

US 2022/0311059 A1 Sep. 29, 2022

(51) Int. Cl.
| | |
|---|---|
| *H01M 10/42* | (2006.01) |
| *H02J 7/00* | (2006.01) |
| *H01R 107/00* | (2006.01) |
| *H01R 24/60* | (2011.01) |

(52) U.S. Cl.
CPC ....... *H01M 10/4257* (2013.01); *H02J 7/0013* (2013.01); *H02J 7/0042* (2013.01); *H01M 2010/4271* (2013.01); *H01M 2010/4278* (2013.01); *H01R 24/60* (2013.01); *H01R 2107/00* (2013.01)

(58) Field of Classification Search
CPC ........... H01M 10/4257; H01M 10/425; H01M 10/46; H01M 10/48; H01M 10/482; H01M 2010/4271; H01M 2010/4278; H02J 7/0013; H02J 7/0042; H01R 24/60; H01R 2107/00
See application file for complete search history.

(56) References Cited

U.S. PATENT DOCUMENTS

| | | | |
|---|---|---|---|
| 10,866,627 B2 | 12/2020 | Agarwal et al. | |
| 10,895,899 B2 | 1/2021 | Waters | |
| 10,901,487 B2 | 1/2021 | Bodnaruk et al. | |
| 2007/0279852 A1* | 12/2007 | Daniel | H04B 1/385 361/728 |

(Continued)

FOREIGN PATENT DOCUMENTS

| | | |
|---|---|---|
| KR | 10-2009-0003878 | 1/2009 |
| KR | 10-1625407 | 5/2016 |

OTHER PUBLICATIONS

Park, Hye Lyun; International Search Report and the Written Opinion of the International Searching Authority, for PCT/US2021/048406, dated Dec. 23, 2021, Korean Intellectual Property Office, Daejeon, Republic of Korea.

*Primary Examiner* — Raymond Alejandro
(74) *Attorney, Agent, or Firm* — Brian M Holt (57) ABSTRACT

A battery provided with at least one battery cell electrically coupled to a battery management circuitry, a power regulation and supply circuitry, a USB-C port controller, an E-marker integrated circuit and a USB interface. The E-marker integrated circuit provided in-line along a CC conductor between the USB-C port controller and the USB interface. The USB-C port controller is configured to enable the E-marker integrated circuit upon reception of a vendor defined message via the USB interface which enables a high power delivery mode between the battery and a device without the presence of a separate interconnecting E-marker cable there between.

16 Claims, 6 Drawing Sheets

(56) References Cited

U.S. PATENT DOCUMENTS

| | | | |
|---|---|---|---|
| 2013/0082644 A1* | 4/2013 | Gagne | H02J 7/00 |
| | | | 320/137 |
| 2018/0277999 A1 | 9/2018 | Hayes et al. | |
| 2018/0287375 A1 | 10/2018 | Su et al. | |
| 2018/0311807 A1 | 11/2018 | Sergyeyenko et al. | |
| 2020/0033924 A1 | 1/2020 | Waters | |
| 2021/0029282 A1* | 1/2021 | Degura | H02J 7/0045 |
| 2022/0150569 A1* | 5/2022 | Hascher | H04N 21/44227 |

* cited by examiner

DIRECT OR CABLE CONNECT HIGH POWER DELIVERY BATTERY

GOVERNMENT LICENSE RIGHTS

This invention was made with government support under PO-0000985 (GTS) awarded by U.S. Army, Army Futures Command, Combat Capabilities Development Command, C5ISR Center, Command Power and Integration Directorate, Power Division, Tactical Power Branch. The government has certain rights in the invention.

BACKGROUND

Field of the Invention

This invention relates to batteries. More particularly, the invention relates to a battery provided with both direct and Universal Serial Bus type C (USB-C) cable connect interfaces capable of high power delivery according to Universal Serial Bus Power Delivery (USB-PD) protocols.

Description of Related Art

Batteries are used to power portable electrical devices. To minimize electrical device size, reduce the time required for a battery exchange and/or enable use of different power capacity batteries according to a specific use/mission, batteries have been provided configured for attachment to external surfaces of the portable electrical devices. For example, in a military context, portable electrical devices may include: radios, global positioning systems, sighting systems, metal detectors, power tools et cetera. Different electrical devices utilize a range of different power capacity and/or power consumption rate requirements.

USB is an interconnection/communications specification and USB-PD is a power delivery specification of the USB Implementers Forum, Inc., both specifications hereby incorporated by reference in their respective entireties. The USB-PD protocol has a high-power delivery mode of up to 20 Volts/5 Amps. A wide range of cables provided with conductors and USB-C connectors capable of a corresponding range of power delivery levels exist. For example, a USB-C cable intended for data transfer may have conductors dimensioned for low power levels, only. To ensure that a device requesting the 5 Amp high power delivery mode is connected with the battery safely, the power capacity of the interconnecting USB-C cable conductors and connectors is verified by the presence of an E-mark integrated circuit chip within the cable that responds to an interrogation signal with the cable's power and data transfer capacities before the 5 Amp high power delivery mode can be initiated. Unless a corresponding E-marker cable is present, the 5 Amp high power delivery mode cannot be initiated under USB-PD protocol.

Therefore, an object of the invention is to provide battery solutions that overcome deficiencies in the prior art.

BRIEF DESCRIPTION OF THE DRAWINGS

The accompanying drawings, which are incorporated in and constitute a part of this specification, illustrate embodiments of the invention, where like reference numbers refer to the same feature or element and may not be described in detail for every drawing figure in which they appear and, together with a general description of the invention given above, and the detailed description of the embodiments given below, serve to explain the principles of the invention.

DETAILED DESCRIPTION:

The inventors have recognized that a standardized battery configuration enables cost and time efficient battery production, warehousing, distribution and use with a wide range of electrical devices.

The inventors have invented a battery 1, as shown for example in FIGS. 1-5, with an interconnection interface that accommodates a wide range of different electromechanical interconnection insertion vectors and/or rotational mechanics. Thereby, a single battery 1 configuration is usable with a wide range of electrical devices 2 and/or an individual battery 1 may be exchanged between electrical devices 2 as needed.

The versatility of the battery 1 is further enhanced by the implementation of the USB-PD standard, enabling use of the battery 1 with USB standard conforming devices 2. However, due to the USB-PD requirement for the presence of an E-marker cable 3, the USB-PD 5 Amp high power delivery mode is not available when a conventional battery is provided direct connected to a device—because there is no cable present in a direct connection. Therefore, the inventors have devised a battery 1 that senses direct connection with a device 2 requesting 5 Amp high power delivery mode and self verifies compatibility without the requirement for the E-marker cable 3 between the battery 1 and the device 2.

Figure 1:
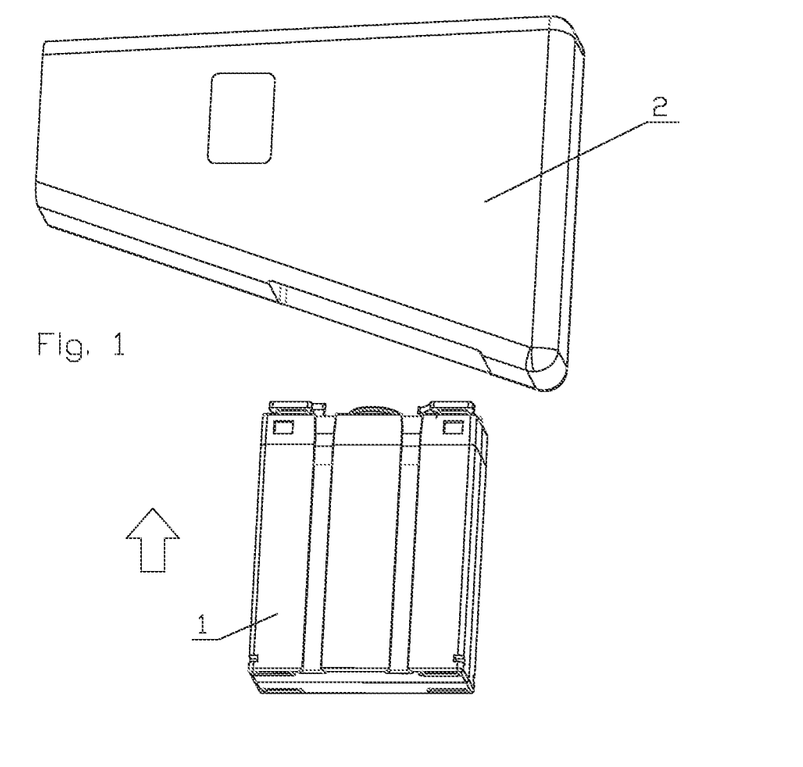
FIG. 1 is a schematic view of an exemplary battery, aligned for direct connection insertion into a device.
Figure 2:
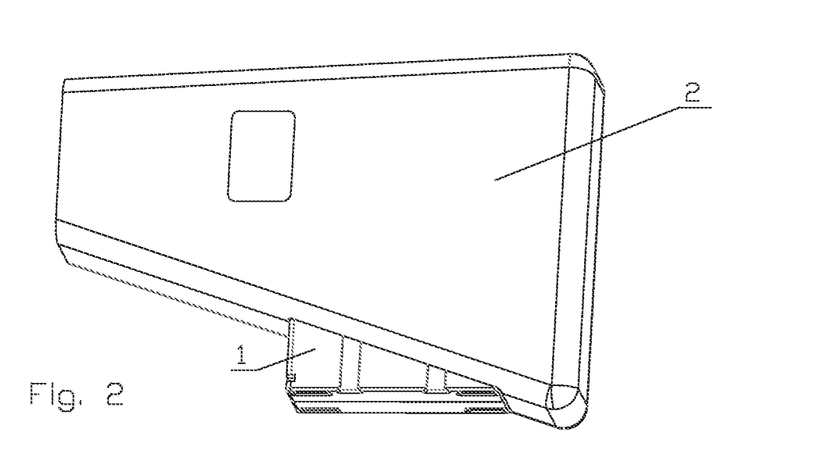
FIG. 2 is a schematic view of the battery and device of FIG. 1, interconnected.
Figure 3:
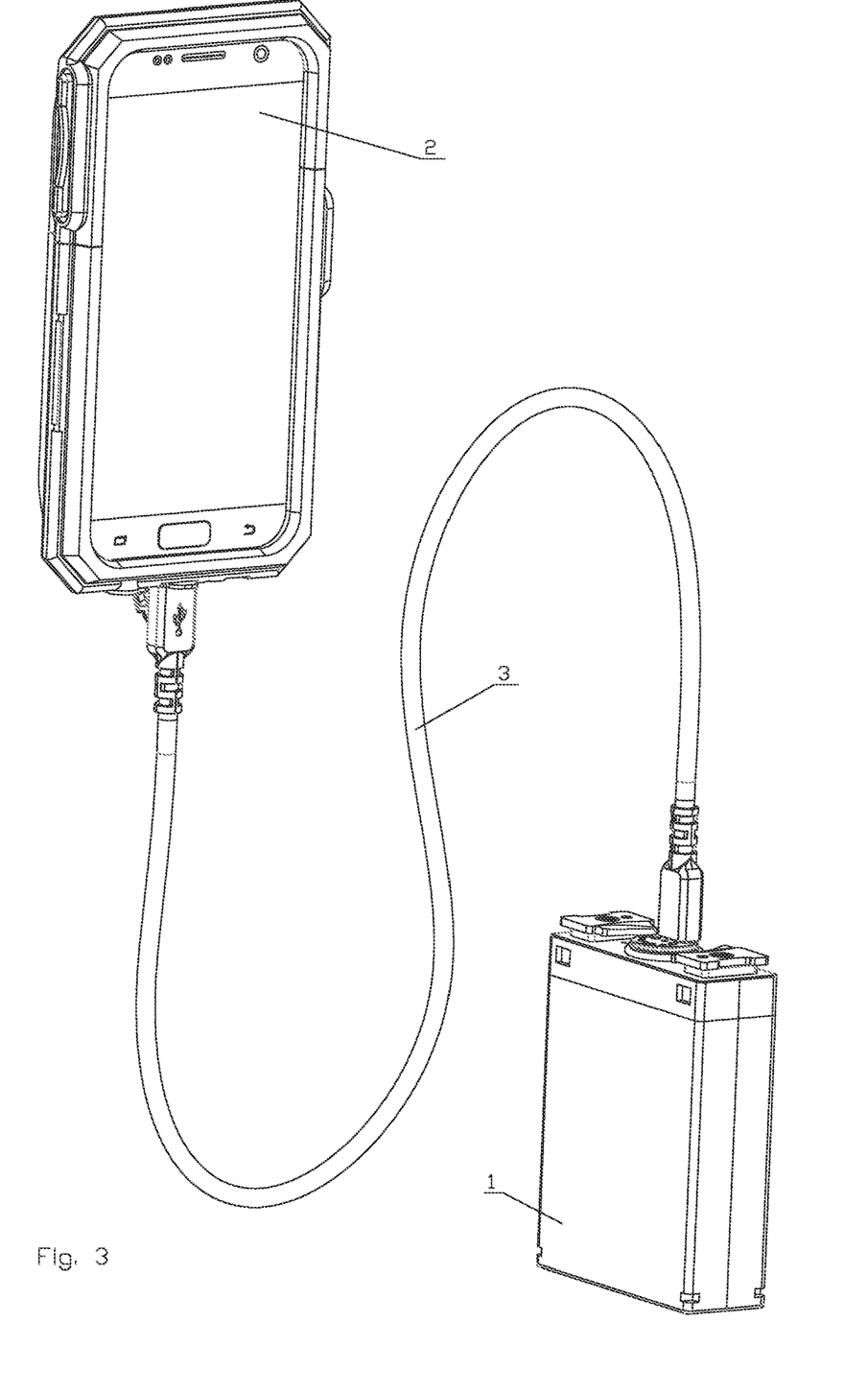
FIG. 3 is a schematic view of an exemplary battery connected to a device via a USB-C cable.
Figure 4:
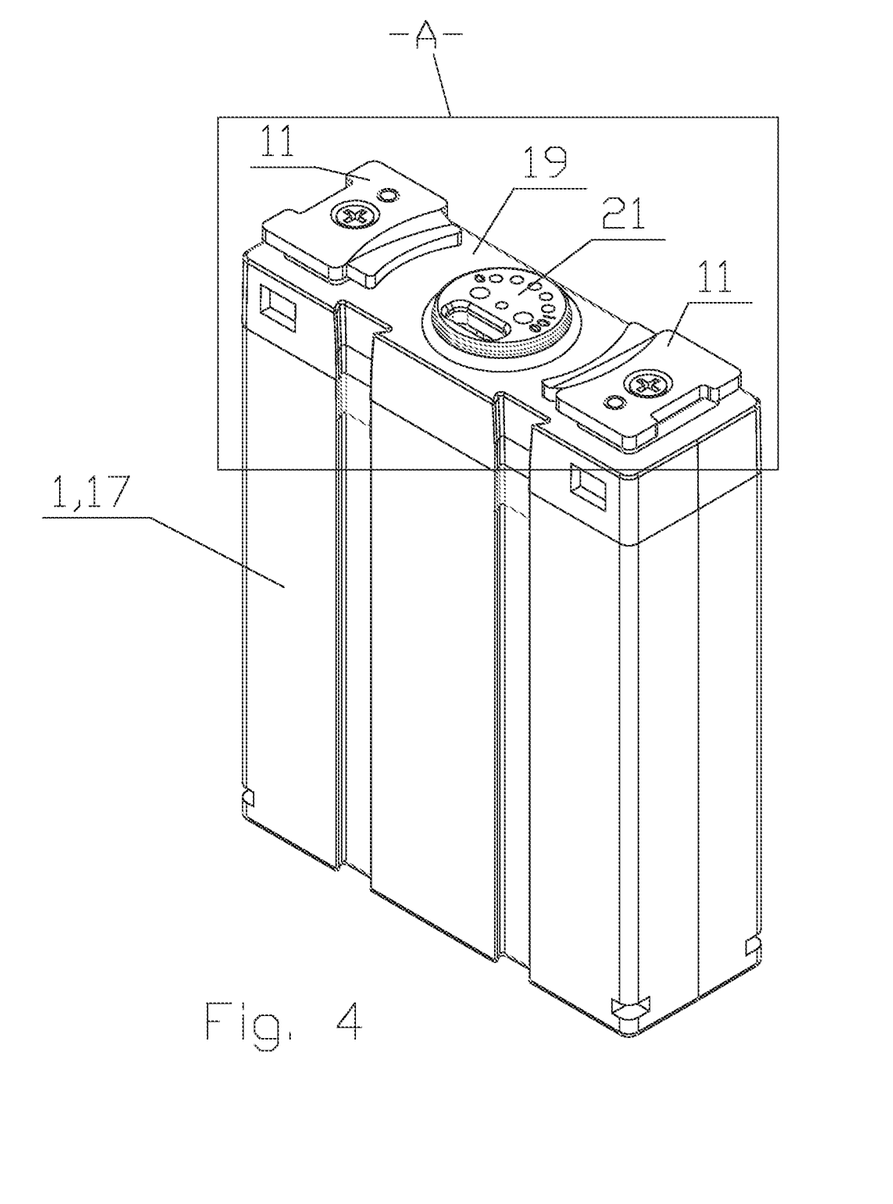
FIG. 4 is a schematic view of an exemplary battery.
Figure 5:
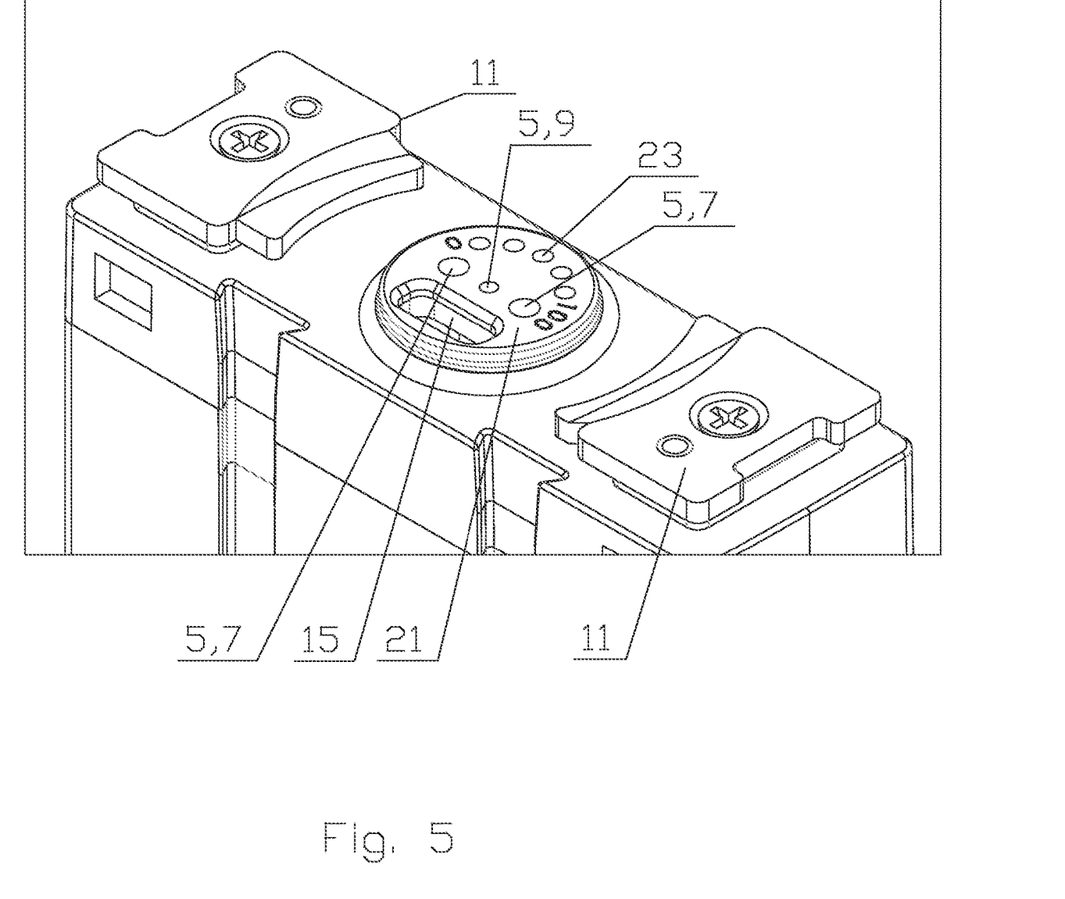
FIG. 5 is a close-up view of area -A- of FIG. 4.

As best shown in FIGS. 4 and 5, an exemplary battery 1 is provided with a USB-C interface 4 that includes both direct connection electrical contacts 5 (Vbus 7 and CC 9 and GND 11) and a separate USB-C socket 15. The battery 1 has a generally cuboid body 17 with a top face 19, a cylindrical terminal 21 extending from a center of the top face 19. The direct connection electrical contacts Vbus 7 and CC 9 and the USB-C socket 15 are provided on the cylindrical terminal 21. State of charge indicia 23 may also be provided on the cylindrical terminal 21.

Conductors of the USB-C socket 15 that correspond to Vbus 7, CC 9 and GND 11 are coupled in parallel with the direct connection electrical contacts 5. Thereby, the battery 1 may be electrically connected to a device 2 via the USB-C interface 4 by either a USB cable (such as an E-marker cable 3) seated in the USB-C socket 15 or by mating of the battery 1 and device 2 that aligns and directly interconnects corresponding conductors of the device 2 (note the USB-C conductor specification utilizes redundant conductors CC1 and CC2 to comprise the CC 9 conductor referenced herein) with the direct connection electrical contacts 5.

Figure 6:
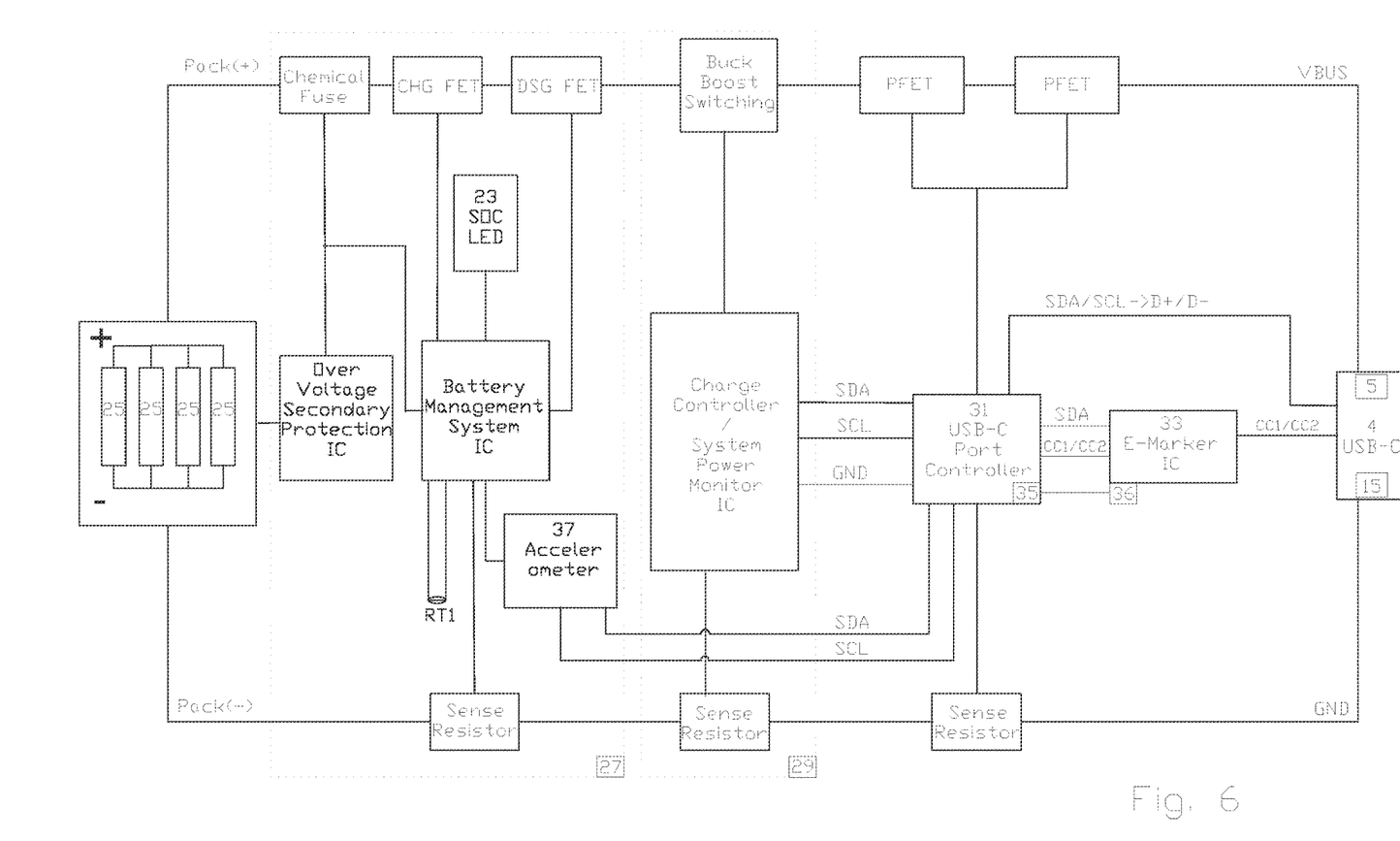
FIG. 6 is a schematic circuit diagram of the battery of FIG. 4.

Internally, as shown for example in FIG. 6, the battery 1 includes one or more battery cells 25, monitored/controlled by battery management circuitry 27, power regulation and supply circuitry 29, a USB-C port controller 31, an E-marker integrated circuit 33 and the USB interface 4.

The battery 1 may be provided, for example, as one or more battery cells 25. Battery cell 25 may utilize any of a wide range of battery chemistry, such as lithium-ion. The battery management circuitry 27 monitors battery status, for example, cell power levels and temperature, providing over voltage protection, fusing, charge level feed back and general battery enablement during charging and discharging optimized for the selected battery chemistry of the battery cells 25. The battery management circuitry 27 may further include an accelerometer 37 for detecting inertial inputs as a means for switching between energized, charge level reporting and standby power modes of the battery 1.

The power regulation supply circuitry 29, comprising for example, a narrow VDC buck-boost battery charge controller/system power monitor integrated circuit and buck-boost switching, receives power configuration and delivery instructions from the USB-C port controller 26 and transforms the power from the battery cells 20 to the requested voltage/current. The USB-C port controller 31 monitors the USB-C interface 4 for connections and negotiates with connected devices 2 to determine a power delivery voltage/current level. The USB-C interface 4 is both a USB-C socket 15 and the direct connection electrical contacts 5, in parallel conductor connection.

As specified by the USB-PD standard, when a request for the 5 Amp high power delivery mode is received from a device 2 (via the presence of a pull-down resistor along the CC conductor(s)), the USB-C port controller 31 queries for the presence of the E-marker integrated circuit 33 provided within 5 Amp capable USB cables and provides power at the 5 Amp power level only if the presence of the E-marker integrated circuit 33 is detected.

The USB-PD standard has no provision for 5 Amp high power delivery mode where no E-marker cable 3 is present between the battery 1 and device 2. A battery 1 according to the invention overcomes this limitation by selectively enabling a battery 1 resident E-marker integrated circuit 33, only when a 5 Amp high power delivery mode compatible device 2 is detected in direct connection with the battery 1.

Figure 7:
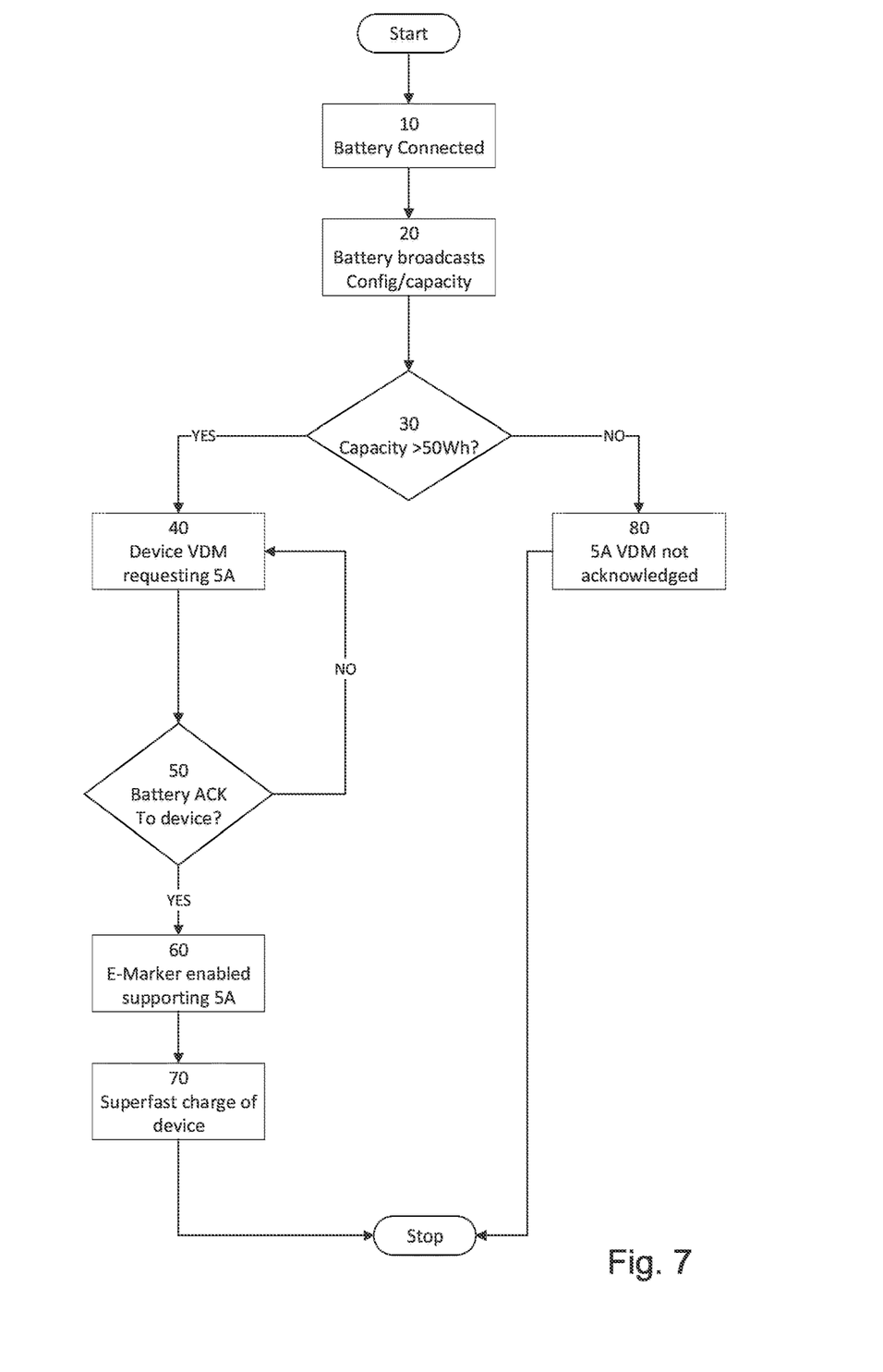
FIG. 7 is a logical flowchart demonstrating rules for 5 Amp high power delivery mode between a 5 Amp high power delivery mode capable battery and device in direct connection.

As shown in FIG. 7, upon direct interconnection (10) with the battery 1, at which time the battery 1 broadcasts its configurations/capacity parameters (20). The capacity of the battery is an initial determinant of whether or not 5 Amp high power mode is possible (30). If the battery 1 has a capacity a device 2 configured for direct connection with the battery 1 which can utilize the 5 Amp high power delivery mode (such as greater than 50 Watt-hours capacity), the device 2 identifies itself to the battery 1 by sending a vendor defined message (VDM) (40) via the CC 9 conductor(s) of the USB interface 4.

If the correct VDM is received by the USB-C port controller 31, the USB-C port controller 31 acknowledges (50) by activating a general-purpose input/output port 35 of the USB-C controller 31 that is coupled to an enable pin 36 of the battery resident E-marker integrated circuit 33, thereby activating the E-marker integrated circuit (60). The battery resident E-marker integrated circuit 33, is provided inline between the USB interface 4 and the USB-C port controller 31. Once activated, the E-marker integrated circuit 33 communicates with the USB-C port controller 31 as if it was present in a cable interconnecting the battery 1 and the device 2, wherein the E-marker integrated circuit 33 enables 5 Amp high power delivery mode between the battery 1 and the interconnected device 2 (70), for example a "superfast" charge mode.

If the battery 1 does not have the greater than 50 Watt-hours capacity (30), any VDM request from the direct connected device 2 is ignored (80), which prevents 5 Amp high power delivery mode therebetween.

One skilled in the art will appreciate that the vendor defined message is recognized by the battery as a pre-arranged code signifying high power mode capability of the device.

Thereby, initiation of direct connection high power mode is safely restricted to battery 1 and device 2 pairs that are both configured for and capable of high power delivery therebetween.

The USB-PD standard is supported by integrated circuit vendors providing both USB port controller and E-marker integrated circuits, greatly simplifying battery circuit design and ensuring a pre-validated compatibility with the USB standard(s). One skilled in the art will appreciate that, building upon the widely supported USB-PD standard, according to the invention, to enable suitably configured devices to receive 5 Amp high power delivery mode when direct connected to the battery—significantly increases the battery utility at minimal additional expense.

| Table of Parts | |
|---|---|
| 1 | battery |
| 2 | device |
| 3 | E-marker cable |
| 4 | USB-C interface |
| 5 | electrical contacts |
| 7 | Vbus |
| 9 | CC |
| 11 | GND |
| 15 | USB-C socket |
| 17 | body |
| 19 | top face |
| 21 | cylindrical terminal |
| 23 | state of charge indicia |
| 25 | battery cell |
| 27 | battery management circuitry |
| 29 | power regulation and supply circuitry |
| 31 | USB-C port controller |
| 33 | E-marker integrated circuit |
| 35 | general purpose I/O port |
| 36 | enable pin |
| 37 | accelerometer |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departure from the scope or spirit of the present invention as defined by the following claims.

We claim:

1. A battery, comprising:
   at least one battery cell electrically coupled to a battery management circuitry, a power regulation and supply circuitry, a USB-C port controller, an E-marker integrated circuit and a USB interface;
   the E-marker integrated circuit provided in-line along a CC conductor between the USB-C port controller and the USB interface;
   the at least one battery cell, the battery management circuitry, the power regulation and supply circuitry, the USB-C port controller, the E-marker integrated circuit and the USB interface provided within a body of the battery;
   wherein the USB-C port controller is configured to enable the E-marker integrated circuit upon reception of a vendor defined message via the USB interface.

2. The battery of claim 1, wherein the USB interface includes conductor contacts and a USB-C socket.

3. The battery of claim 2, wherein the vendor defined message indicates that a device coupled to the conductor contacts requests a high-power mode.

4. The battery of claim 2, wherein the body has a top face, a cylindrical terminal extending from a center of the top face, a top of the cylindrical terminal provided with the conductor contacts and the USB-C socket.

5. The battery of claim 2, wherein the conductor contacts include a Vbus contact, and a CC contact.

6. The battery of claim 5, wherein the Vbus contact and the CC contact are electrically coupled to corresponding conductors of the USB-C socket.

7. The battery of claim 5, wherein the vendor defined message is received via the CC contact.

8. The battery of claim 1, wherein the USB-C port controller enablement of the E- marker integrated circuit is via a general-purpose input/output port of the USB-C port controller that is electrically coupled to an enablement pin of the E-marker integrated circuit.

9. The battery of claim 1, wherein the battery manager has an accelerometer for detecting inertial inputs as a means for switching between power modes of the battery.

10. A method for validating a high power mode for a battery, comprising the steps of:
    providing at least one battery cell electrically coupled to a battery management circuitry, a power regulation and supply circuitry, a USB-C port controller, an E- marker integrated circuit and a USB interface;
    the E-marker integrated circuit provided in-line along a CC conductor between the USB-C port controller and the USB interface;
    the at least one battery cell, the battery management circuitry, the power regulation and supply circuitry, the USB-C port controller, the E-marker integrated circuit and the USB interface provided within a body of the battery; and
    configuring the USB-C port controller to enable the E-marker integrated circuit upon reception of a vendor defined message via the USB interface.

11. The method of claim 10, wherein the USB interface includes conductor contacts and a USB-C socket.

12. The method of claim 11, wherein the conductor contacts include a Vbus contact, and a CC contact.

13. The method of claim 11, wherein the vendor defined message is received via the CC contact.

14. The method of claim 10, wherein the E-marker integrated circuit is enabled only if the battery has a capacity capable of providing the high power mode.

15. The method of claim 14, wherein the high power mode is between the battery and a device direct connected to the battery via the USB interface.

16. The method of claim 15, wherein the vendor defined message is recognized by the battery as a pre-arranged code signifying high power mode capability of the device.

* * * * *